Aug. 11, 1953 L. D. CLARK 2,648,783
ELECTRICAL CONTROL SYSTEM FOR ENGINE
DRIVEN GENERATOR SETS
Filed Dec. 19, 1946
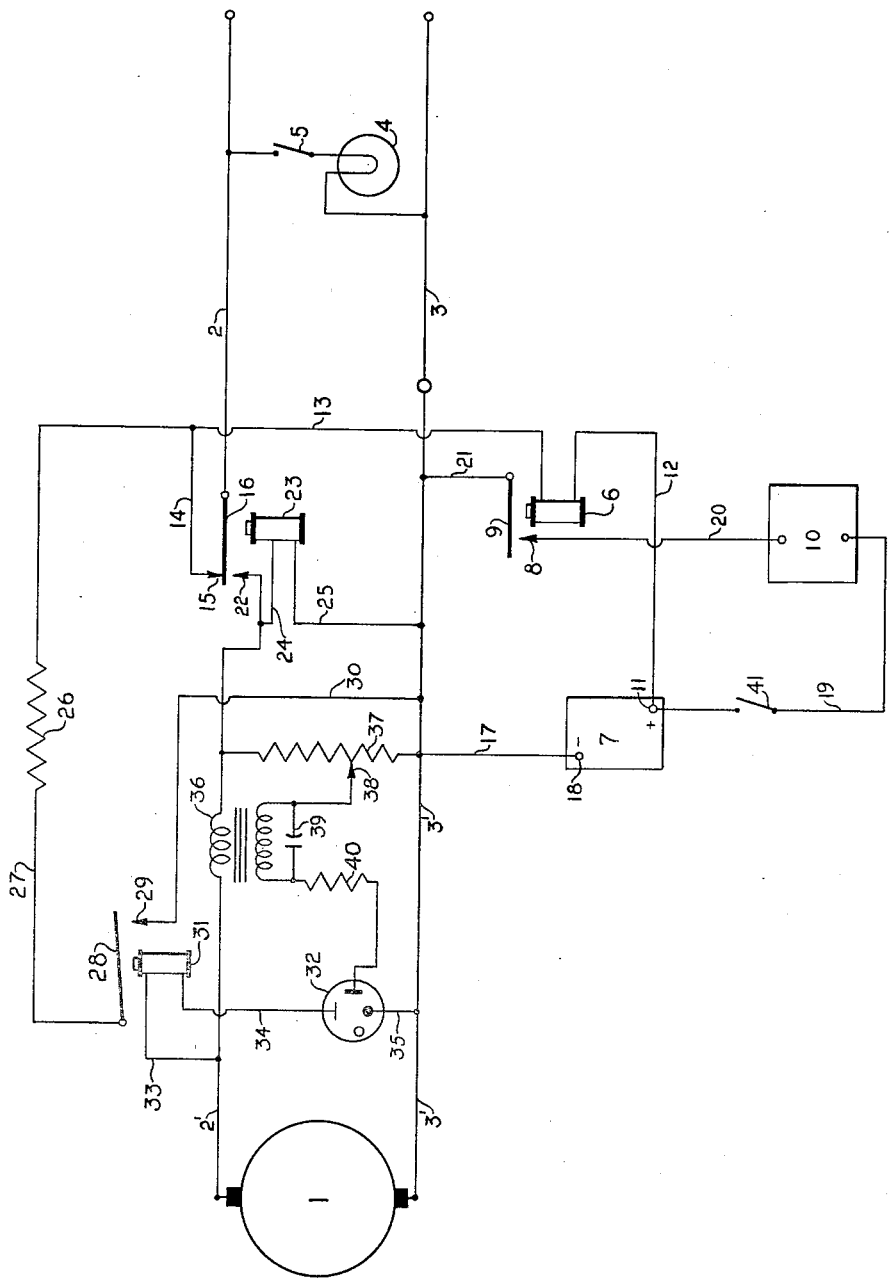
INVENTOR
LORIS D. CLARK
BY J. L. Walker
ATTORNEY Patented Aug. 11, 1953

2,648,783

UNITED STATES PATENT OFFICE 2,648,783

ELECTRICAL CONTROL SYSTEM FOR ENGINE DRIVEN GENERATOR SETS

Loris D. Clark, Dayton, Ohio, assignor, by mesne assignments, to Master Vibrator Company, Dayton, Ohio, a corporation of Ohio Application December 19, 1946, Serial No. 717,113

12 Claims. (Cl. 290—30)

1

This invention pertains to an electrical control system, and more particularly to a means for controlling the operation of engine driven electric generator sets.

Such engine driven generator sets are more commonly used in rural areas where centralized power supply is unobtainable, or in relatively small generating plants. Regardless of where such generating units are used, however, it is necessary to provide some means for automatically putting the generator into operation upon a demand for current and for halting operation of the generator upon removal of the current demand.

The present invention is concerned primarily with the provision of an automatic control means for the generator which is responsive to demand made upon the circuit for current. Engine driven generator units of the type disclosed herein are commonly attainable, most of which units have some form of an automatic starting means therefor. Most of the presently known starting units have various disadvantages, and it is the object of the present invention to overcome the disadvantages now present in the available units.

A further object of the invention is to improve the construction as well as the means and mode of operation of automatic starting equipment for engine driven generators whereby such equipment may not only be economically manufactured, but will be more efficient in use, automatic in operation, uniform in action, comprise a minimum number of parts, and be unlikely to get out of repair.

A further object of the invention is to provide a control system for engine driven generator sets which is responsive to relatively small current demands.

A further object of the invention is to provide a control unit for engine driven generator sets comprising relatively few movable operating parts.

A further object of the invention is the provision of an improved and more sensitive control circuit for engine driven generator sets.

A further object of the invention is to provide means for shifting the phase of currents induced in the control circuits so as to substantially agree with the generator output.

A further object of the invention is to provide means for limiting the power in the control circuits to a predetermined maximum regardless of generator output.

A further object of the invention is to provide a circuit for the automatic control of engine driven generator sets having the advantageous features, the inherent meritorious characteristics and the mode of operation hereinafter described.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, there is diagrammatically shown a control circuit for automatically controlling the operation of engine driven generator sets, which circuit is the preferred, but not necessarily the only form of embodiment of the invention.

As illustrated in the drawing the engine driven generator 1, when operating, furnishes A. C. power to the power supply lines 2 and 3, which distribute power to the point of consumption, for example within a farm house situated relative to the generator set. For purposes of illustration, there is shown at 4 an ordinary incandescent light bulb connected across the supply lines 2 and 3. The bulb 4 merely represents a load which may be placed upon the generator, the application of the load to the power lines being controlled by the switch 5 which is in series with the load 4.

The circuit as shown is in the non-operating or rest condition, there being no demand upon the supply lines 2 and 3 for power, and the generator 1 being at rest. Upon closing of the load control switch 5, a demand is placed upon the supply lines 2 and 3 and the generator is put in operation as a result thereof.

The generator is connected to and driven by an internal combustion engine, and to place the generator in operating condition, the engine must be started or "cranked." There is provided for this purpose a remote or semi-automatic starting unit which not only energizes the engine starter, but controls the ignition current for the engine. Such starting units in most cases also include a so-called "crank limiting" device which limits the cranking or starting period for the engine to a predetermined time interval. Should the engine fail to start within such time, the starting unit is de-energized and the engine remains at rest until a second attempt is made to start the engine, or the trouble is remedied. Such starting units are commercially available, usually from the engine manufacturer.

The generator is automatically placed in operation upon demand for current by closing of the load control switch 5. Relay coil 6 is thereby energized by the storage battery 7 whereupon the contacts 8 and 9 are closed to place the automatic starting unit 10 in circuit with the battery 7.

The relay 6 requires but a small operating current and even though placed in series with the load 4 and load control switch 5, the battery 7 provides sufficient current to energize the coil upon completion of the energizing circuit. Closing of the switch 5 completes the energizing circuit for the coil 6 from the battery terminal 11 through conductor 12 to the coil 6 from where the circuit follows conductors 13 and 14 to contact 15 of a transfer switch 16 in the generator output line 2'. From switch 16 the circuit continues through supply line 2, switch 5 and load 4 to supply line 3 which is connected to the generator output line 3' from which the circuit is completed through conductor 17 to the battery terminal 18. The transfer switch 16 is normally biased into the position shown in the drawing so as to permit completion of the low voltage energizing circuit for the relay 6.

Energization of the relay 6 through the circuit just outlined closes the low voltage battery circuit to the automatic engine starting unit 10 which thereupon energizes the engine starter and controls the ignition current to the engine. The armature 9 of the relay 6 is pulled into engagement with the contact 8 by energization of the coil 6 to complete the circuit from battery terminal 11 through conductor 19 to starter 10, from where the circuit returns to battery 7 through conductor 20, switch contacts 8 and 9, conductor 21, output line 3', and conductor 17 to battery terminal 18.

Energization of the automatic starting unit 10 through the foregoing circuits starts the engine, and thereby puts the generator 1 in operation. No load is placed on the generator, however, until it reaches substantially normal operating condition. During the initial starting period, all completed electrical circuits are of low voltage D. C. variety, the power being supplied by the storage battery 7. To change the power lines 2 and 3 from low voltage D. C., which is utilized for the starting operation, to the normal A. C. voltage the transfer switch 16 is moved from contact 15 into engagement with contact 22 which is in the high voltage A. C. line.

Movement of the switch 16 is accomplished by the relay coil 23 connected across the generator output lines 2' and 3' by means of the conductors 24 and 25. The relay 23 is voltage operated, and the coil is so designed that it will not be energized until the generator 1 has attained a predetermined voltage output, for example 100 volts A. C. By this means the load 4 is not applied to the generator until such time as the generator has substantially arrived at normal operating potential, inasmuch as the power distribution line 2 is not connected to the generator output line 2' until the switch 16 is moved into engagement with contact 22.

While movement of the transfer switch 16 into engagement with contact 22 connects the generator 1 to the supply lines 2 and 3, such movement interrupts the ignition current to the engine since opening of switch 15—16 de-energizes the relay coil 6, thereby opening switch 8—9 which interrupts the battery circuit for the automatic engine starting unit 10 controlling the engine ignition. A holding circuit is therefore necessary in order that the relay coil 6 may remain energized to provide control for the engine ignition.

The holding circuit for the relay 6 is energized by the closing of switch 28—29 thereby completing a circuit from the battery 7 through conductor 12, to the coil 6. The return side of the circuit is from coil 6 through conductor 13 to a resistor 26, and from there by means of conductor 27 to the switch 28—29 and through conductor 30, output line 3' and conductor 17 to the battery 7. The low voltage D. C. circuit is thereby again completed to energize the relay coil 6 which through switch 8—9 controls the ignition current for the engine.

Movement of the switch 28 is controlled by the relay coil 31, energization of which is under the control of a cold cathode thyratron (relay) tube 32. The coil 31 is connected across the generator output lines 2' and 3' by means of the conductors 33, 34 and 35, the control tube 32 being interposed between the conductors 34 and 35. The control tube 32 functions as a sensitive switch, responding to relatively small A. C. currents.

Energization of the tube 32 is directly controlled by the A. C. output of the generator 1. Interposed in the output line 2' is the primary coil of a series transformer 36, the secondary of which provides a part of the power necessary for the operation of the tube 32. Additional operating power for the tube 32 is provided by the potentiometer 37 which is directly connected across the output lines 2' and 3'. An adjustable tap 38 is utilized so that the amount of power provided by the potentiometer may be adjusted to a predetermined amount, which power is added to that induced in the secondary of the transformer 36 to operate the tube 32.

The amount of power provided by the secondary of the transformer 36 varies in relation to the load demand on the A. C. line, the output power increasing with an increase in demand. The potentiometer is so adjusted that the power produced thereby is substantially constant but slightly less than that needed to energize tube 32. The sum of this power when added to that produced by the transformer 36 is sufficient to energize the tube 32, thereby closing the circuit to the coil 31 of the holding switch 28. To protect the tube 32 from excessive power resulting from operation of the generator at maximum output, a condenser 39 is connected across the secondary terminals of the transformer 36 and a resistor 40 is also inserted in series in the energizing circuit of the control tube 32. The constants of the potentiometer 37, the condenser 39 and the resistor 40 are so selected as to limit the power applied to the control tube.

The conjoint use of the potentiometer 37 and condenser 39 shifts the phase of the current induced in the secondary of the transformer 36 so that it matches the phase of the generator output. This phase shifting function takes place when operating with small current values representing relatively light loads on the generator. The phase relation of the potentiometer power and transformer power being the same, these voltages may be favorably combined so that the total power produced by the two sources represents the arithmetical sum of the individual components.

As current increases in the primary of the transformer due to increase in generator load the induced current in the secondary thereof increases, and at the same time becomes more and more out of phase with the potentiometer power thereby effectively limiting the total power supplied for energization of the tube 32. As the two sources of power for energization of the tube shift out of phase, the sum total of the sources does not increase in direct proportion to the increase in individual amounts, since one tends to counteract the other. Being out of phase, the total of the two sources becomes in effect the difference, since one source is in effect negative while the other is positive. The net total power produced by the two sources is therefore the geometric sum of the two sources.

While the net power produced by the two sources increases as the generator load increases, the increase in power is not in direct proportion to the increase in load. The maximum power produced by the transformer and potentiometer never exceeds the maximum safe limit for the tube 32.

It has been found that the application of a single 25 watt light to the power supply lines, results in sufficient power being induced in the secondary of the transformer 36 which when added to that provided by the potentiometer produces the power required for energization of the control tube 32. From this it may be seen that the present arrangement is quite sensitive, in that it responds to relatively small A. C. loads. Full and efficient operation of the generator unit is assured even though the power demand thereon be relatively small.

The time interval between opening of the switch 8—9 by movement of the transfer switch 16, and the reclosing of the switch 8—9 by closing of the holding switch 28 is of very short duration and there is no interruption to the A. C. potential delivered by the generator since the inertia of the engine flywheel is sufficient to maintain necessary generator speed.

Removal of the load from the A. C. supply lines 2—3 results in a decrease in the output of the transformer 36 to an amount below that necessary to energize the control tube 32. De-energization of the tube 32 thereupon occurs and the coil 31 of the holding switch 28 is de-energized. Opening of the holding switch 28 de-energizes the coil 6 thereby opening switch 8—9 in the D. C. circuit controlling the engine ignition. This shuts the engine off, and the generator comes to rest and remains in such condition until the re-application of a load to the supply lines 2—3 by re-closing of the load switch 5.

The generator may also be manually stopped, even though operating to supply power in response to load demand by opening the normally closed switch 41 in conductor 19 thus interrupting the battery circuit to the starting unit 10. This switch is manually controlled and is usually incorporated in the starting unit 10 as a part thereof.

For the sake of simplicity and also for more efficient operation and economical construction, it should be noted that all of the primary low voltage D. C. controls are located on the grounded or common side of the system which permits use of the generator output and supply lines 3'—3 as a common conductor to complete all the circuits. By such arrangement the necessity for considerable additional wiring is eliminated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modification within the legitimate and valid scope of the appended claims.

Having thus described my invention, I claim:

1. Control means for an engine driven alternating current generator set having engine starter and ignition supply means, comprising an initial starting circuit controlling energization of the starter and ignition supply, a supplemental circuit controlling the continued energization of the ignition supply, a cold cathode thyratron controlling said supplemental circuit, and energizing means for said thyratron including a series transformer connected in series with the generator output, the output of which is responsive to generator load, a potentiometer across the generator output, the output of the potentiometer being substantially constant irrespective of generator load, the construction and arrangement being such that the output of the potentiometer plus the output of the series transformer is sufficient to energize the thyratron, only a relatively small transformer output being necessary to provide sufficient power to energize the thyratron, and means for preventing application of excessive power to the thyratron when full load is applied to the generator.

2. Control means for an engine driven alternating current generator set having engine starter and ignition supply means, including an initial starting circuit controlling energization of the starter and ignition supply, and a supplemental circuit controlling the continued energization of the ignition supply including a relay coil coupled across the generator output, an electrically controlled relay switch in series therewith controlling the energization of said coil, said relay switch being responsive to a predetermined load upon the generator, a primary substantially constant source of energizing power for said switch, and a supplemental source of power therefor, said supplemental source being additive with respect to said primary source and varying in relation to the demand upon the generator, the construction and arrangement being such that the primary source of power is insufficient to energize said electrically controlled relay switch.

3. Starting means for an engine driven alternating current generator set having an engine starter and ignition supply means, including a direct current starter energizing circuit, means for controlling said circuit by application of demand on the alternating current supply lines, a transfer switch responsive to a predetermined generator output transferring the alternating current supply lines from the direct current starting circuit to the alternating current generator, and means for re-establishing the direct current ignition circuit upon interruption thereof by movement of the transfer switch including a relay connected across the generator output, a cold cathode thyratron in series with said relay controlling the operation thereof, and energizing means therefor responsive to demand upon the alternating current supply lines.

4. In an automatic starter for engine driven generator sets, a low voltage direct current starting circuit energized by application of load to the alternating current supply lines, a transfer switch responsive to a predetermined alternating current potential produced by operation of the generator, which interrupts the direct current circuit and completes the alternating current circuit, a holding switch re-establishing the direct current circuit to provide ignition current for the engine, and means for actuating the holding switch energized by the generator output, said means including a cold cathode thyratron acting as a control switch therefor, means for energizing said thyratron in response to alternating current demand in excess of a predetermined minimum, and means for protecting said thyratron switch from excessive current when the generator is operating at full rating.

5. Control means for an engine driven alternating current generator set having engine starter and ignition supply means, comprising an initial starting circuit controlling energization of the starter and ignition supply, a supplemental circuit controlling the continued energization of the ignition supply, an electrically operated relay controlling said supplemental circuit, and energizing means therefor including a transformer in series with the generator, a potentiometer in parallel with the generator and a power supply circuit interconnecting the switch with the transformer and potentiometer, the construction and arrangement being such that the relay is operated only when the generator output is above a predetermined minimum selected by the potentiometer.

6. Control means for an engine driven alternating current generator set having a low voltage direct current ignition supply circuit, comprising means for maintaining the ignition supply circuit after starting the generator, including an electrically controlled relay for energizing said means, dual sources of power for operating said electrically controlled relay, one of said sources being substantially constant irrespective of generator load, the other of said sources varying in relation to the generator load, the construction and arrangement being such that neither source of power is by itself sufficient to operate said electrically controlled relay, means for adding the power derived by one source to that derived from the other source, the minimum sum of which is sufficient to operate the electrically controlled relay, and means preventing application of excessive power to the electrically controlled relay when the total power derived from the dual sources is at its maximum.

7. Control means for an engine driven alternating current generator set having a low voltage direct current ignition supply circuit, including a control circuit for the engine ignition, a cold cathode thyratron control for said circuit, and means for operating said thyratron including a relative constant power supply therefor, means for manually adjusting said supply to an amount slightly less than that required for operation of said thyratron, an additional power supply, the output of which is automatically varied in accordance with the generator load, means for adding the output of the variable supply to that of the constant supply, and means for protecting the thyratron from the application of excessive power, the construction and arrangement being such that the variable power supply responds to the application of relatively small generator loads, the output of which when added to the output of the constant power supply provides sufficient power to operate the thyratron control for the ignition circuit.

8. Controls means for an engine driven alternating current generator set having an ignition control circuit, means for energizing said control circuit including an electrically operated relay, means responsive to generator load for operating said relay, including a series transformer the primary coil of which is energized by the generator output, a potentiometer coupled to the generator output, the output of the transformer varying in relation to generator load and the potentiometer output being substantially constant regardless of generator load, and a condenser coupled to the output of the transformer, the construction and arrangement being such that the potentiometer and condenser conjointly act to bring the transformer output into proper phase relation with the generator output when the generator is operating at light load.

9. Control means for an engine driven alternating current generator having ignition control means including an electrically operated switch responsive to generator output in excess of a predetermined minimum, energizing means therefor comprising dual sources of power, the output of one of said sources varying in direct proportion to variations in generator load, the output of the other of said sources being substantially constant regardless of generator load, and means for varying the phase relation of one of said sources relative to the other in response to variations in generator load, the construction and arrangement being such that as the generator load increases the dual sources of power are shifted further and further out of phase to counteract the increase in power produced by one of said sources in response to increase in generator load.

10. In a control circuit for engine driven generator sets, an electrically operated relay, energizing means therefor including a series transformer the output of which varies in direct proportion to the generator load, a potentiometer coupled to the generator output, the power produced by said potentiometer being substantially constant regardless of generator load, means for coupling the outputs of the transformer and potentiometer to energize the electrically operated relay, and means for automatically shifting the phase relation of the transformer output relative to potentiometer output to limit the combined output of the transformer and potentiometer to a predetermined maximum.

11. Control means for an engine driven generator set including an engine control circuit operative to start the engine upon application of load to the power lines, a transfer switch for connecting the generator to the power lines upon attainment of a predetermined generator output, and a supplemental engine control circuit energized upon application of the predetermined generator output to the power lines to maintain engine operation including independent additive sources of energizing power therefor, the sum of which is sufficient to energize the supplemental engine control circuit.

12. Control means for an engine driven generator set having a secondary engine control circuit energized upon attainment of a predetermined generator output, characterized by an electrically operated control relay therefor responsive to a predetermined minimum power supply, and multiple additive independent power supply means for said relay, the individual supplies being insufficient to operate the relay, but conjointly operative to provide a total power supply in excess of the predetermined minimum necessary to operate the control relay.

LORIS D. CLARK.

References Cited in the file of this patent

UNITED STATES PATENTS

| Number | Name | Date |
|---|---|---|
| Re. 15,258 | Ernest | Jan. 3, 1922 |
| 1,028,364 | Knight et al. | June 4, 1912 |
| 1,248,848 | Gugler | Dec. 4, 1917 |
| 1,290,940 | Eby | Jan. 14, 1919 |
| 1,389,716 | Van Vleet | Sept. 6, 1921 |
| 1,422,027 | Bucher | July 4, 1922 |
| 1,498,346 | Bucher | June 17, 1924 |
| 1,498,347 | Bucher | June 17, 1924 |
| 1,704,996 | Witzel | Mar. 12, 1929 |
| 1,707,296 | Brotz | Apr. 2, 1929 |
| 1,774,491 | Thorne | Aug. 26, 1930 |
| 1,866,494 | Strong | July 5, 1932 |
| 1,938,742 | Demarest | Dec. 12, 1933 |
| 2,006,529 | Strong | July 2, 1935 |
| 2,215,867 | Baumann et al. | Sept. 24, 1940 |
| 2,231,582 | Knight et al. | Feb. 11, 1941 |
| 2,290,682 | Geiselman | July 21, 1942 |
| 2,411,358 | Bichsel | Nov. 19, 1946 |

FOREIGN PATENTS

| Number | Country | Date |
|---|---|---|
| 366,452 | Great Britain | Feb. 25, 1927 |